(12) United States Patent
Nannen et al.

(10) Patent No.: US 10,879,822 B2
(45) Date of Patent: Dec. 29, 2020

(54) METHOD FOR STARTING UP A PERMANENT-MAGNET SYNCHRONOUS MACHINE, AND PERMANENT-MAGNET SYNCHRONOUS MACHINE

(71) Applicant: Siemens Aktiengesellschaft, Munich (DE)

(72) Inventors: Hauke Nannen, Nuremberg (DE); Heiko Zatocil, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/348,813

(22) PCT Filed: Nov. 10, 2016

(86) PCT No.: PCT/EP2016/077201
§ 371 (c)(1),
(2) Date: May 9, 2019

(87) PCT Pub. No.: WO2018/086688
PCT Pub. Date: May 17, 2018

(65) Prior Publication Data
US 2019/0267921 A1 Aug. 29, 2019

(51) Int. Cl.
*H02P 27/06* (2006.01)
*H02P 6/28* (2016.01)
(Continued)

(52) U.S. Cl.
CPC .............. *H02P 6/28* (2016.02); *H02P 1/46* (2013.01); *H02P 6/16* (2013.01); *H02P 6/18* (2013.01);
(Continued)

(58) Field of Classification Search
CPC .......... H02P 1/46; H02P 2207/05; H02P 6/16; H02P 6/18; H02P 6/182; H02P 6/20; H02P 6/28
See application file for complete search history.

(56) References Cited

U.S. PATENT DOCUMENTS

2012/0313566 A1* 12/2012 Benecke ................. H02P 27/16
318/721
2015/0333685 A1* 11/2015 Wei .......................... H02P 27/16
318/430

FOREIGN PATENT DOCUMENTS

DE 102010008814 A1 8/2011

OTHER PUBLICATIONS

Benecke Marcel: "Anlauf auf von energieeffizienten Synchronmaschinen mit Drehstromsteller", XP055392434, Found in the Internet: URL:http://d-nb.into/1054135258/34 [found Jul. 20, 2017] p. 3, paragraph 1.2—paragraph 1.2; Drehstromsteller für PMSM; p. 32, p. 33, paragraph 3.1—p. 36, paragraph 3.1.2; p. 44, paragraph 3.3—p. 46; p. 65, paragraph 3.7; fig. 3.21; the whole document,; 2012.
(Continued)

*Primary Examiner* — Muhammad S Islam
(74) *Attorney, Agent, or Firm* — Henry M. Feiereisen LLC

(57) ABSTRACT

In order to achieve the energy efficiency class IE4 defined in IEC standard 60034, it is necessary to operate permanent-magnet synchronous machines directly from the supply system. Since this is not readily possible, soft-starting devices come into consideration as cost-effective solutions. The problem of transmitter-free running up can be split into two component problems: determining the initial rotor angle and running up the machine. The present invention describes a (rotary) transmitter-free starting method with which the motor can be started using a soft-starting device.

6 Claims, 4 Drawing Sheets

(51) Int. Cl.
    *H02P 6/16*     (2016.01)
    *H02P 6/20*     (2016.01)
    *H02P 6/18*     (2016.01)
    *H02P 6/182*     (2016.01)
    *H02P 1/46*     (2006.01)

(52) U.S. Cl.
    CPC ............ *H02P 6/182* (2013.01); *H02P 6/20* (2013.01); *H02P 2207/05* (2013.01)

(56) References Cited

OTHER PUBLICATIONS

Acarnley Paul P et al: "Review of position-sensoriess operation of brushless permanent-magnet machines", IEEE Transactions on Industrial Electronics, vol. 53, No. 2, pp. 352-362, XP055018619, ISSN: 0278-0046, DOI: 10.1109/TIE.2006.870868; Position sensing using Motional EMF; p. 353, right column, paragraph III—p. 355; 2006.
Cheng Kuang-Yao et al: "Design of a sensorless commutation IC for BLDC motors", IEEE Transactions on Power Electronics, Institute of Electrical and Electronics Engineers, USA, vol. 18, No. 6, pp. 1365-1375, XP011103246, ISSN: 0885-8993, DOI: 10.1109/TPEL.2003.818867; p. 1371, paragraph: E-Starting Procedure: p. 1372; fig. 7; 2003.

\* cited by examiner

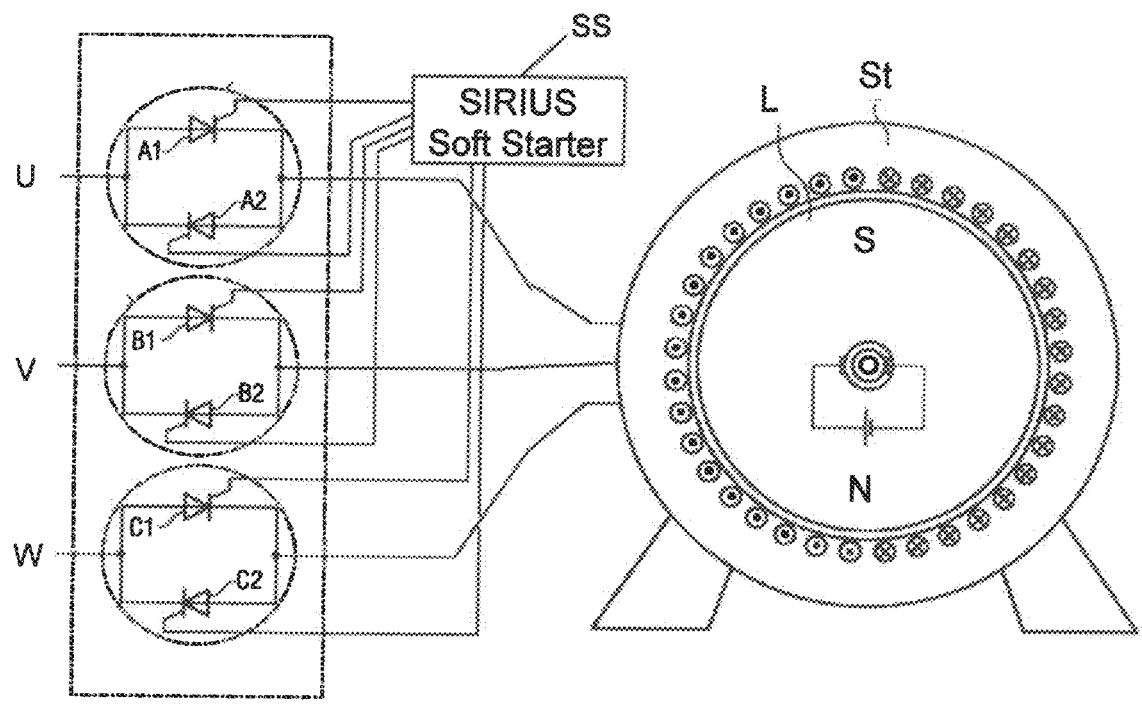
FIG 1
FIG 2
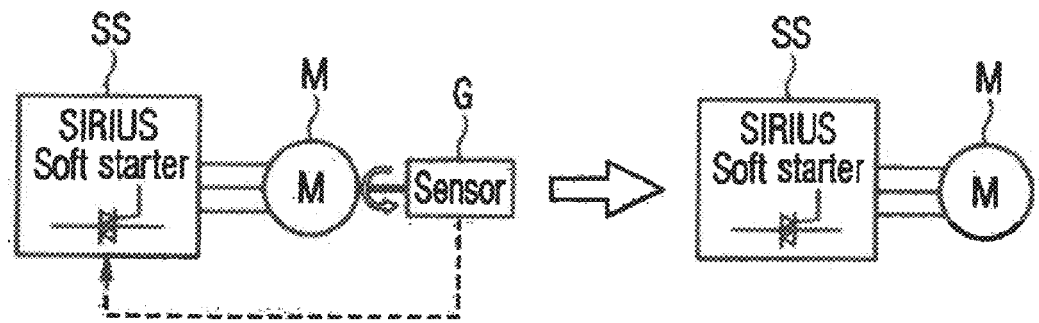

METHOD FOR STARTING UP A PERMANENT-MAGNET SYNCHRONOUS MACHINE, AND PERMANENT-MAGNET SYNCHRONOUS MACHINE

CROSS-REFERENCES TO RELATED APPLICATIONS

This application Is the U.S. National Stage of International Application No. PCT/EP2016/077201, filed Nov. 10, 2016, which designated the United States and has been published as International Publication No. WO 2018/086688.

BACKGROUND OF THE INVENTION

A three-phase machine converts mechanical energy into three-phase current or three-phase current into mechanical energy. In principle, it can be operated as an electrical generator or as an electric motor. Measures for power limitation during switch-on of an electrical device, for example of an electric motor, are referred to as soft starting.

In accordance with IEC standard 60034, three-phase machines are divided in terms of their efficiency into different energy efficiency classes. Even in the lower power range up to approximately 20 kW, the legislative efficiencies for electric drives can only be adhered to with difficulty, for which reason increasingly the use of permanent magnets in the rotor is desired, for example as a permanent-magnet synchronous machine (PMSM).

FIG. 1 shows a schematic illustration of such a permanent-magnet synchronous machine in the embodiment as a revolving-field machine comprising a stator St and a rotor L. The rotor comprises a magnetic north pole N and south pole S and winding phases U, V, W connected to respective windings by way of thyristors A1, A2 for phase U; B1, B2 for phase V; and C1, C2 for phase W, all of which are controlled by a soft starter SS, as also shown schematically in FIG. 2. The illustration should be understood merely by way of example and does not have any restrictive effect on the scope of protection of the claimed subject matter.

This type of machine does provide the possibility of high degrees of energy efficiency, but starting and operation on the stiff power supply system are not readily possible.

In order to make this possible, a squirrel-cage damper winding can be provided in the rotor of the machine, said squirrel-cage damper winding enabling safe ramp-up on the stiff power supply system but subjecting the feed power supply system to severe loads owing to very high starting currents.

Likewise, operation using a suitable power electronics actuator, such as, for example, a frequency converter or soft starter, is possible. In this case, in particular the use of a soft starter, also referred to as soft start device, represents a cost-friendly solution to the ramp-up of a PMSM on the stiff power supply system. Such a soft start device decreases the voltage during switch-on (e.g. by means of phase angle) and slowly increases it until reaching the full system voltage. A soft start of this type is however typically only possible in the no-load state or with low load. At present, there is as yet no market-ready solution known for this.

In the dissertation by Dr. Marcel Benecke (University of Magdeburg) entitled "Anlauf von energieeffizienten Synchronmaschinen mit Drehstromsteler" [Starting of energy-efficient synchronous machines using a three-phase power controller], hereinafter referred to as "Benecke method", a solution to the ramp-up of the permanent-magnet synchronous machine using a soft starter is proposed. The method proposed in this work does require the present rotor angle of the machine, however, with the result that the motors used for the work need to be equipped with a corresponding sensor system. A sensor is understood to mean speed sensors and position sensors. These sensors detect the mechanical variables of speed and position. Their signals are necessary for supplying actual values to the closed-loop controllers and for closing the existing position and speed control loops. The position and speed signals also act as an important input variable for the current control loop for the vectoral closed-loop control methods in three-phase drives. The sensor in this case detects the speed and/or position directly on the motor shaft.

The sensor system does, however, have a negative effect on the costs and availability of the system, which at present makes a soft start solution for high-efficiency motors unattractive. For these reasons, a method for ramp-up without sensors is desired.

SUMMARY OF THE INVENTION

The object of the invention consists in specifying a method for running up a permanent-magnet synchronous machine without sensors. A further object of the invention consists in specifying a permanent-magnet synchronous machine without sensors which operates using the method according to the invention.

The required starting method differs from the sensorless methods known from the prior art in that it needs to be usable for a thyristor controller and not a frequency converter. A direct consequence of this is that a method with test signal injection at low speeds owing to the hardware topology cannot be realized—the known methods are not transferrable to the present application case.

For the method according to the invention, it is necessary for the initial rotor position and the optimal firing angle for the three-phase machine to be determined beforehand. One possible method for this is described in published US Patent Application US-2020/0059183 A1, the content of which is incorporated herein in its entirety by reference. It is assumed in the method described here that this known angle is available on starting up.

As described previously, all known sensorless methods require a pulse-controlled inverter. The known method for starting the permanent-magnet synchronous machine using a soft start device requires the electrical angle of the motor and obtains same from a measurement system.

The method described here is based on the principle that, when firing the thyristors for the first time, the machine is accelerated with the maximum possible torque. For this, it should be ensured that the motor has already exceeded a determined minimum speed after the initial firing and thus the induced voltages during the principle-related blocking time of the thyristors can be measured precisely enough. From the induced voltages, the electrical angle of the motor can subsequently be determined according to the already known "EMF method" and transferred to the Benecke method (from the aforementioned dissertation). Furthermore, in a two-phase firing operation, the voltage of the third phase can be measured directly and taken into account in the analysis.

Since motors using soft start devices mostly drive passive loads with linear or quadratic load characteristics, the torque is used almost entirely to accelerate the inert mass on the initial firing. As such, it can be assumed that the acceleration on the initial firing is sufficient and the induced voltages can be measured precisely enough. When measuring the voltages, it is possible to make use of the measurement sensors already present in the series soft start device. The method therefore requires no additional hardware.

BRIEF DESCRIPTION OF THE DRAWING

The invention is also illustrated by the following figures:
FIG. 1 shows a section through an exemplary three-phase machine;
FIG. 2 is a schematic representation of the assembly according to the invention.

DETAILED DESCRIPTION OF PREFERRED EMBODIMENTS

FIG. 2 shows the basic desired assembly of the permanent-magnet synchronous machine (M) with soft starter (SS) without sensors and with sensors (G) on the left.

The individual steps are explained in greater detail hereinafter.

Step 1: Determining the Optimum Firing Angle:

Once the process for initially aligning the machine has been completed, the current angle of the motor is known. On the basis of this known starting angle, that firing angle of the soft starter for which the torque generated in the motor is maximum for a given maximum current can be calculated according to the method described in published US Patent Application US-2020/0059183 A1. To produce a highest possible torque on the first firing of the thyristors, the maximum permissible current on the initial firing is set to the maximum permissible current for the power semiconductors.

When calculating the optimum firing angle, the profile of the rotation angle and speed during the firing of the thyristors is also generally input, but these are not known when calculating the firing angle. For this reason, the optimum firing angle should first be determined for the initial firing in the context of a startup procedure for the drive.

Figure 3:
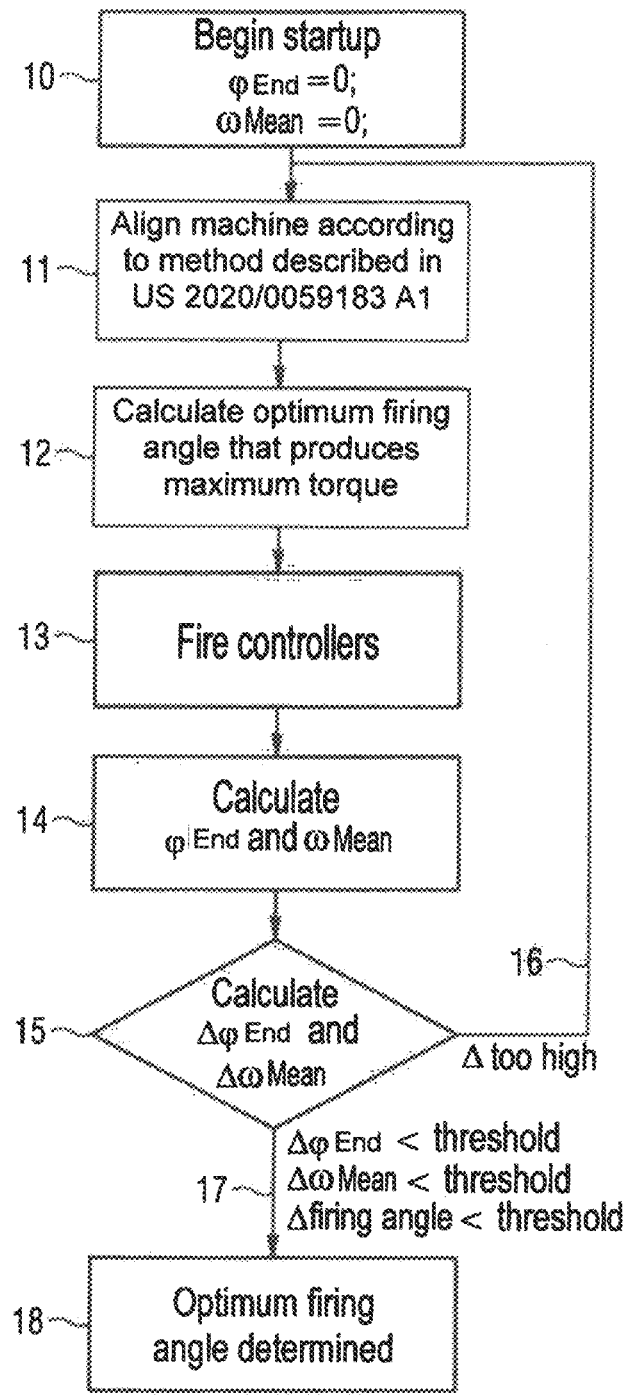
FIG. 3 shows a flowchart.

The flowchart of FIG. 3 illustrates one possible approach. The optimum firing angle is calculated, the soft starter is fired once using same and the final angle and the average rotational speed are subsequently determined. Using these values, an optimum firing angle is calculated again, the motor is aligned according to the method described in published US Patent Application US-2020/0059183 A1 and restarted. This procedure is repeated until the stop criterion (e.g. change in the values between runs) is met.

In step 10, the values $\varphi_{End}$ and $\omega_{Mean}$ are set to 0.
In step 11, the permanent-magnet synchronous machine is initially aligned.
In the next step, 12, the optimum firing angle is calculated, for example according to the method cited in the introduction to the description (Benecke method).
Step 13 comprises the firing of the thyristors (controllers). Next, $\Delta\varphi_{End}$ and $\Delta\omega_{Mean}$ are determined, in step 17.
As long as $\Delta\varphi_{End}$, $\Delta\omega_{Mean}$ and $\Delta$firing angle are all below a determined threshold value, the optimum firing angle is calculated, 18. Otherwise, if one of the $\Delta$ values is too high, the method must be rerun.

It is conceivable for the optimum firing angle to be determined for the initial firing not through calculation, but instead only on the basis of the quantities $\varphi\varphi_{End}$ and $\omega_{Mean}$, which are calculated during startup. That angle for which $\varphi\varphi_{End}$ or $\omega_{Mean}$ is maximum constitutes the optimum firing angle.

Step 2: Switching to the EMF (Electromotive Force) Method:

Once the permanent-magnet synchronous machine has been accelerated by the initial firing, the voltages induced by the rotation of the machine are high enough that they can be measured during the blocking phase of the thyristors. On the basis of the measured voltages, the flux angle of the machine can subsequently be determined e.g. by an observer or by a straightforward arctangent calculation. Similarly, it is conceivable for the rotation angle to be determined only on the basis of excited voltages, measured currents and machine equations, i.e. using an algorithm.

Regardless of the chosen approach, in the aforementioned cases, numerous methods are already known from the field of sensorless control and these may be used.

The flux angle determined using the EMF method is transferred to the Benecke method as an actual value and the next optimum firing angle on rotation of the machine is determined herefrom.

Measurements:

In FIGS. 4 to 8, diagrams based on measurements from a real permanent-magnet three-phase machine in the laboratory are shown. These demonstrate that it is already possible to determine the flux angle from the measured voltages by means of a straightforward arctangent calculation.

Figure 4:
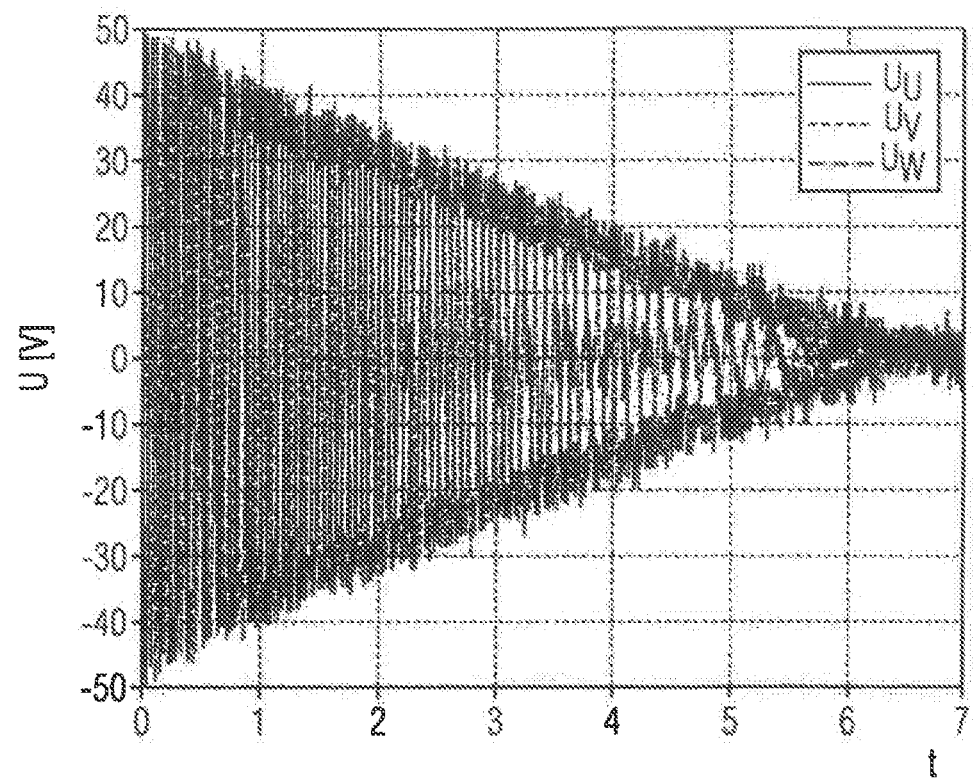
FIG. 4 shows the measured profile of the electromotive force EMF on rundown.

FIG. 4 shows the profile of the measured electromotive force EMF on rundown of the machine, in which the voltage U is plotted against time t.

Figure 5:
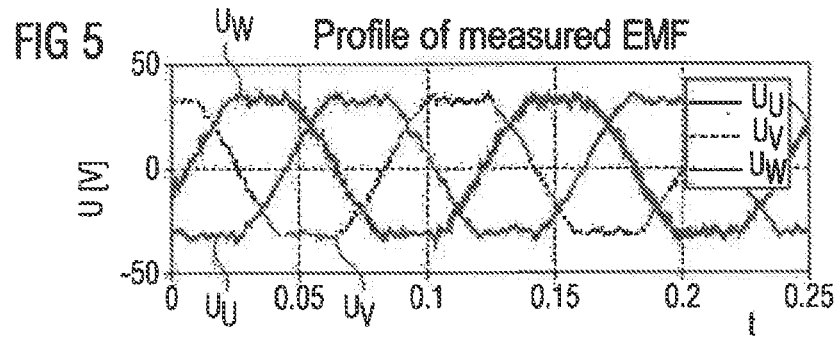
FIGS. 5 and 7 respectively show the profile of a measured EMF.
Figure 6:
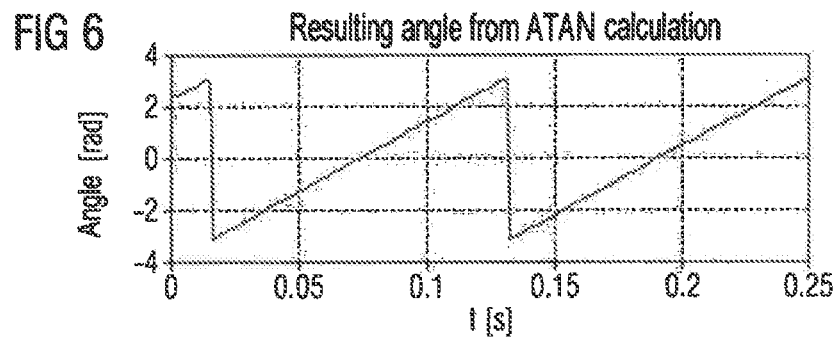
FIGS. 6 and 8 show the associated resulting angle from arctangent (ATAN) calculation.
Figure 7:
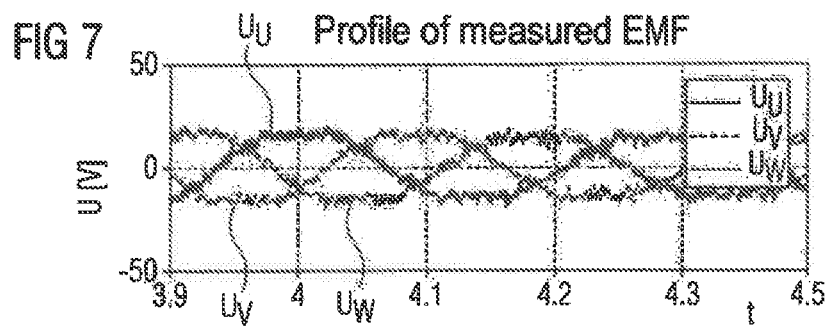
Figure 8:
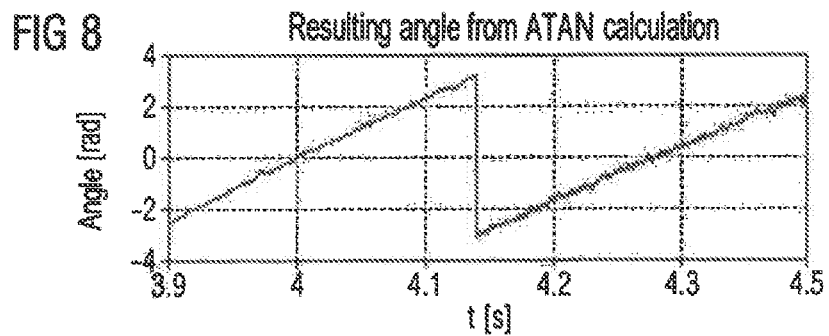

FIGS. 5 and 7 show measurements relating to the measured EMF over time, and the respective angle calculated thereby from an arctangent calculation.

To achieve the energy efficiency class IE4 defined in IEC standard 60034, it is necessary to operate permanent-magnet synchronous machines (PMSM) directly from the power supply system. Since this is not readily possible (see above), soft start devices come into consideration as a cost-effective solution. To achieve this, an (expensive) sensor system is required in the prior art. For an economically practical solution, sensorless ramp-up must be made possible.

The required starting method differs from the sensorless methods scientifically and technologically known in that it needs to be usable for a thyristor controller and not a frequency converter. As such, these known methods are not suitable.

In summary, the fundamental principle is based on the motor being accelerated at maximum using the initial firing of the thyristors and subsequently calculating the flux angle of the machine on the basis of the measured induced voltages. After the first firing procedure, the flux angle of the machine can already be determined directly from the measured terminal voltage (the phase currents are meanwhile zero). The determination operation is not based on a calculation model, but rather on the direct measurement of the induced voltages, i.e. the electromotive force, EMF. For the second firing procedure, the calculated angle can then be used. Measurements show that the angle can be determined from the measured voltages very successfully, even at low speeds.

In order to actually accelerate the machine at maximum during the initial firing, the optimum firing angle can be precisely determined when starting the machine (the starting angle is known) in the context of a described startup procedure. The described starting procedure is based only on the measurement values that are already present in the series device and requires no additional sensors. Thus, it is possible to upgrade an existing product for operating an IE4 motor using only a software solution.

What is claimed is:

1. A method for starting-up a permanent-magnet synchronous machine, said method comprising:
    a) setting initial values of a rotor angle $\varphi_{End}$ and an average rotation speed $\omega_{Mean}$ of a rotor of the permanent-magnet synchronous machine to zero, wherein the rotor angle $\varphi_{End}$ and the average rotation speed $\omega_{Mean}$ are determined solely from a measured terminal voltage of the permanent-magnet synchronous machine without use of an external shaft sensor;
    b) orienting the rotor to an initial position;
    c) rotating the rotor from the initial position with a maximum torque by firing thyristors, wherein the maximum torque is determined by a maximum permissible current for power semiconductors of the thyristors;
    d) measuring a voltage induced by a rotation of the rotor;
    e) determining an optimum firing angle of the permanent-magnet synchronous machine based on a measured rotor angle $\varphi_{End}$ and a measured average rotation speed $\omega_{Mean}$ of the rotor, and
    f) repeating steps a) through e) when a difference $\Delta\varphi_{End}$ or $\Delta\omega_{Mean}$ between successive measured rotor angles $\varphi_{End}$ and measured average rotation speeds $\omega_{Mean}$ is greater than a predetermined threshold value.

2. The method of claim 1, wherein the permanent-magnet synchronous machine is a multi-phase machine having a dedicated thyristor for each phase, and wherein the rotor is rotated by firing two thyristors of at least three thyristors of the permanent-magnet synchronous machine at a maximum permissible current.

3. The method of claim 1, wherein the voltage is measured in a blocking time of the thyristors.

4. The method of claim 1, wherein the voltage is measured by a soft starter of the permanent-magnet synchronous motor.

5. The method of claim 1, wherein an initial value of the optimum firing angle is calculated once, and the once calculated value is used for each subsequent start-up of the permanent-magnet synchronous machine.

6. A permanent-magnet synchronous machine, comprising:
    a rotor;
    a plurality of thyristors connected to phases of the permanent-magnet synchronous machine; and
    a soft starter configured to
    a) set initial values of a rotor angle $\varphi_{End}$ and an average rotation speed $\omega_{Mean}$ of a rotor of the permanent-magnet synchronous machine to zero, wherein the rotor angle $\varphi_{End}$ and the average rotation speed $\omega_{Mean}$ are determined solely from a measured terminal voltage of the permanent-magnet synchronous machine without use of an external shaft sensor,
    b) orient the rotor to an initial position,
    c) rotate the rotor with a maximum torque from the initial position by firing at least some of the plurality of the thyristors, wherein the maximum torque is determined by a maximum permissible current for power semiconductors of the thyristors,
    d) measure a voltage induced by the rotation of the rotor,
    e) determine an optimum firing angle of the permanent-magnet synchronous machine based on a measured rotor angle $\varphi_{End}$ and a measured average rotation speed $\omega_{Mean}$ of the rotor, and
    f) repeat steps a) through e) when a deviation $\Delta\varphi_{End}$ or $\Delta\omega_{Mean}$ between successive measured rotor angles $\varphi_{End}$ and measured average rotation speeds $\omega_{Mean}$ is greater than a predetermined threshold value.

* * * * *